(12) United States Patent
Gunawardena et al.

(10) Patent No.: US 8,656,454 B2
(45) Date of Patent: Feb. 18, 2014

(54) DATA STORE INCLUDING A FILE LOCATION ATTRIBUTE

(75) Inventors: Dinan Srilal Gunawardena, Cambridge (GB); Richard Harper, Cambridge (GB); Eno Thereska, Cambridge (GB)

(73) Assignee: Microsoft Corporation, Redmond, WA (US)

(*) Notice: Subject to any disclaimer, the term of this patent is extended or adjusted under 35 U.S.C. 154(b) by 535 days.

(21) Appl. No.: 12/957,957

(22) Filed: Dec. 1, 2010

(65) Prior Publication Data
US 2012/0144448 A1   Jun. 7, 2012

(51) Int. Cl.
*H04L 29/06* (2006.01)

(52) U.S. Cl.
USPC .......................................................... 726/1

(58) Field of Classification Search
None
See application file for complete search history.

(56) References Cited

U.S. PATENT DOCUMENTS

| | | | |
|---|---|---|---|
| 5,469,553 A | 11/1995 | Patrick | |
| 5,628,007 A * | 5/1997 | Nevarez | 1/1 |
| 5,933,826 A * | 8/1999 | Ferguson | 1/1 |
| 6,006,018 A * | 12/1999 | Burnett et al. | 709/219 |
| 6,625,614 B1 * | 9/2003 | Chang et al. | 1/1 |
| 6,766,314 B2 * | 7/2004 | Burnett | 707/694 |
| 6,925,529 B2 | 8/2005 | Bohrer et al. | |
| 7,032,011 B2 * | 4/2006 | Woodard et al. | 709/220 |
| 7,032,119 B2 | 4/2006 | Fung | |
| 7,035,972 B2 | 4/2006 | Guha et al. | |
| 7,043,650 B2 | 5/2006 | Bresniker et al. | |
| 7,092,943 B2 | 8/2006 | Roese et al. | |
| 7,093,149 B2 | 8/2006 | Tsirkel et al. | |
| 7,340,487 B2 * | 3/2008 | Chang et al. | 1/1 |
| 7,568,097 B2 * | 7/2009 | Burnett | 713/165 |
| 7,600,137 B2 | 10/2009 | Trappeniers et al. | |
| 7,673,161 B2 | 3/2010 | Freeman et al. | |
| 7,877,781 B2 * | 1/2011 | Lim | 726/1 |
| 8,266,176 B2 * | 9/2012 | Nakamura et al. | 707/781 |
| 8,312,064 B1 * | 11/2012 | Gauvin | 707/822 |
| 2002/0062301 A1 * | 5/2002 | Rudoff et al. | 707/1 |
| 2002/0104080 A1 * | 8/2002 | Woodard et al. | 717/176 |
| 2002/0129000 A1 * | 9/2002 | Pillai et al. | 707/1 |
| 2002/0167952 A1 | 11/2002 | Watson et al. | |
| 2002/0177449 A1 | 11/2002 | McDonnell et al. | |

(Continued)

OTHER PUBLICATIONS

U.S. Appl. No. 11/945,104, filed Nov. 26, 2007, Stephen Hodges, Yuvraj Agarwal, Paramvir Bahl, Ranveer Chandra, Scott James, "Low-Power Operation of Networked Devices". 35 pages.

(Continued)

*Primary Examiner* — Oscar Louie
(74) *Attorney, Agent, or Firm* — Pablo Tapia; Micky Minhas; Zete Law, P.L.L.C.

(57) ABSTRACT

A data store including a file location attribute is described. In an embodiment, the location attribute for a data element, such as a file or database record, is stored with the bytes of data and records the geographic location of the data element. Writing to this attribute is limited to a single trusted entity, such as an operating system, to ensure that the location data can be trusted and when a data element is moved or replicated, the attribute is updated to reflect the new location of the data element. This location data is made available to users and applications by a metadata service which tracks the locations of data elements and responds to requests from users. Access control policies can been defined in terms of location and stored at the metadata service and the metadata service can then enforce these policies when responding to requests.

20 Claims, 7 Drawing Sheets

(56) References Cited

U.S. PATENT DOCUMENTS

| | | | |
|---|---|---|---|
| 2003/0028514 A1* | 2/2003 | Lord et al. | 707/1 |
| 2003/0217299 A1 | 11/2003 | Neuman et al. | |
| 2004/0103202 A1* | 5/2004 | Hildebrand et al. | 709/229 |
| 2004/0107273 A1 | 6/2004 | Biran et al. | |
| 2004/0128556 A1* | 7/2004 | Burnett | 713/201 |
| 2004/0230848 A1 | 11/2004 | Mayo et al. | |
| 2005/0044436 A1 | 2/2005 | Holle | |
| 2005/0204027 A1 | 9/2005 | Claseman | |
| 2006/0041594 A1* | 2/2006 | Chang et al. | 707/200 |
| 2006/0171329 A1 | 8/2006 | Ying | |
| 2006/0251115 A1 | 11/2006 | Haque et al. | |
| 2007/0006174 A1 | 1/2007 | Sohm et al. | |
| 2007/0011472 A1 | 1/2007 | Cheng | |
| 2007/0022121 A1 | 1/2007 | Bahar et al. | |
| 2007/0079063 A1 | 4/2007 | Mizuno | |
| 2007/0136489 A1 | 6/2007 | Temoshenko et al. | |
| 2007/0150713 A1 | 6/2007 | Almeida et al. | |
| 2007/0162582 A1 | 7/2007 | Belali et al. | |
| 2008/0276016 A1 | 11/2008 | Fujibayashi | |
| 2008/0276042 A1 | 11/2008 | Hetzler et al. | |
| 2008/0301760 A1* | 12/2008 | Lim | 726/1 |
| 2009/0063878 A1 | 3/2009 | Schmidt et al. | |
| 2009/0249001 A1 | 10/2009 | Narayanan et al. | |
| 2010/0023788 A1 | 1/2010 | Scott et al. | |
| 2010/0036834 A1 | 2/2010 | Bandas | |
| 2010/0106903 A1 | 4/2010 | Fujibayashi et al. | |
| 2010/0169678 A1 | 7/2010 | Kozuka | |
| 2010/0257142 A1 | 10/2010 | Murphy et al. | |
| 2012/0030242 A1* | 2/2012 | Nakamura et al. | 707/781 |
| 2012/0078643 A1* | 3/2012 | Nagpal et al. | 705/1.1 |
| 2012/0110044 A1* | 5/2012 | Nagpal et al. | 707/827 |

OTHER PUBLICATIONS

U.S. Appl. No. 12/059,695, filed Mar. 31, 2008, Dushyanth Narayanan, Austin Donnelly, Sameh Elnikety, Antony Rowstron, Eno Thereska, "Storage Systems Using Write Off-Loading".

U.S. Appl. No. 12/714,223, filed Feb. 26, 2010, Eno Thereska, Austin Donnelly, Dushyanth Narayanan, "Reducing Power Consumption of Distributed Storage Systems". 58 pages.

Abd-El-Malek, Courtright II, Cranor, Ganger, Hendricks, Klosterman, Mesnier, Prasad, Salmon, Sambasivan, Sinnamohideen, Strunk, Thereska, Wachs, Wylie, "Ursa Minor versatile cluster-based storage", retrieved on Dec. 30, 2009 at <<http://www.pdl.cmu.edu/PDL-FTP/SelfStar/ursaminor-fast05.pdf>>, USENIX Association, Proceedings of Conference on File and Storage Technology (FAST), Dec. 13, 2005, pp. 1-14.

"Active Notifications White Paper", Microsoft Corporation, Nov. 2006, pp. 16.

"Advanced Power Management", COPAN Systems, 2007, pp. 1-2.

Agarwal, et al., "Dynamic Power Management using on Demand Paging for Networked Embedded Systems", IEEE, 2005, pp. 755-759.

Agarwal, et al., "On Demand Paging Using Bluetooth Radios on 802.11 Based Networks", CECS, Jul. 2003, pp. 19.

Agarwal, et al., "Somniloquy: Augmenting Network Interfaces to Reduce PC Energy Usage", retrieved on Nov. 22, 2010 at <<http://research.microsoft.com/pubs/79419/agarwal-NSDI09-Somniloquy.pdf>>, USENIX Association, Proceedings of Symposium on Networked Systems Design and Implementation (NSDI), Boston, Massachusetts, Apr. 2009, pp. 365-380.

Agarwal et al., "Somniloquy: Maintaining Network Connectivity While Your Computer Sleeps", Mircosoft Research MSR-TR-2008-42, Mar. 2008 pp. #1-pp. #14.

Agarwal, et al., "Wireless Wakeups Revisited: Energy Management for VoIP over Wi-Fi Smartphones", ACM, 2007, pp. 14.

Allman, et al., "Enabling an Energy-Efficient Future Internet Through Selectively Connected End Systems", ACM SIGCOMM HotNets, 2007, pp. 1-7.

Anand, et al., "SelfTuning Wireless Network Power Management", ACM MobiCom 2003 (1581137532/03/0009), 2003, pp. 176-189.

Anderson, et al., "Serverless Network File Systems" ACM, 1995, pp. 1-21.

Aranya, et al., "Tracefs A File System to Trace Them All" in Proc. USENIX Conference on File and Storage Technologies (FAST 2004), 2004, pp. 15.

"Autonomous Mode Operation for Marvell USB 8388", retrieved on Sep. 27, 2007, at <<http://dev.laptop.org/ticket/1060.>>, pp. 5.

Bahl, et al., "Wake on Wireless—a Case for Multi Radio Wireless LAN", Apr. 4, 2002, pp. 47.

Baker, et al., "Measurements of a Distributed File System", ACM, 1991, pp. 198-212.

Baker, et al., "Non-Volatile Memory for Fast, Reliable File Systems" in Proc. International Conference on Architectural Support for Programming Languages and Operating Systems (ASPLOS 1992), pp. 1-13.

Barroso, Holzle, "The Case for Energy-Proportional Computing", retrieved on Dec. 30, 2009 at <<http://www.cra.org/ccc/docs/ieee_computer07.pdf>>, IEEE Computer Society Press, vol. 40, No. 12, Dec. 2007, pp. 33-37.

Benini, et al., "A Survey of Design Techniques for System-Level Dynamic Power Management", IEEE VLSI Transactions (1063 8210/00), vol. 8, No. 3, 2000, pp. 299-316.

Borisov, et al., "Generic Application-Level Protocol Analyzer and its Language", Microsoft Research, MSR-TR-2005-133, 2005, pp. 1-15.

Carrera, et al., "Conserving Disk energy in network servers", ACM, 2003, pp. 12.

"Cell2Notify: Caller ID Based Notifications on Smartphones", at <<http://research.microsoft.com/netres/projects/cell2notify/>>, Microsoft Corporation, 2007, pp. 1.

"Cheetah 10K.7", Seagate Technology LLC, 2004, pp. 2.

Colarelli, et al., "Massive Arrays of Idle Disks for Storage Archives" IEEE, 2002, pp. 11.

Dahlin, et al., "Cooperative Caching: Using Remote Client Memory to Improve File System Performance" in Proc. Symposium on Operating Systems Design and Implementation (OSDI 1994), pp. 14.

DeCandia, Hastorun, Jampani, Kakulapati, Lakshman, Pilchin, Sivasubramanian, Vosshall, Vogels, "Dynamo: Amazon's Highly Available Key-value Store", retrieved on Dec. 30, 2009 at <<http://s3.amazonaws.com/AllThingsDistributed/sosp/amazon-dynamo-sosp2007.pdf>>, ACM SIGOPS Operating Systems Review (SOSP), vol. 41, No. 6, 2007, pp. 205-220.

Decker, "Requirements for a Location-Based Access Control Model", retrieved on Aug. 26, 2010 at <<http://delivery.acm.org/10.1145/1500000/1497259/p346-decker.pdf?key1=1497259&key2=2653182821&coll=GUIDE&dl=GUIDE&CFID=101946902&CFTOKEN=51824440>>, ACM, Proceedings of Intl Conference on Advances in Mobile Computing and Multimedia (MoMM), Linz, Austria, Nov. 2008, pp. 346-349.

Douglis, et al., "Thwarting the Power-Hungry Disk", USENIX Winter Technical Conference, 1994, pp. 292-306.

"Dropbox—Online backup, file sync, and sharing made easy", retrieved on Apr. 4, 2011 at <<https://www.dropbox.com>>, Dropbox, 2011, pp. 1.

Flautner, "Automatic Performance Setting for Dynamic Voltage Scaling", MobiCom 2001, 2001, pp. 260-271.

Flinn, et al., "Managing Battery Lifetime with Energy-Aware Adaptation", ACM Transactions on Computer Systems, vol. 22, No. 2, 2004, pp. 137-179.

Gashti, et al., "An UPnP-based context-aware framework for ubiquitous mesh home networks", retrieved on Nov. 22, 2010 at <<http://ieeexplore.ieee.org/stamp/stamp.jsp?arnumber=05449966>>, IEEE Intl Symposium on Personal, Indoor and Mobile Radio Communications (PIMRC), Tokyo, Japan, Sep. 2009, pp. 400-404.

Ghemawat, Gobioff, Leung, "The Google File System", retrieved on Dec. 30, 2009 at <<http://labs.google.com/papers/gfs-sosp2003.pdf>>, ACM SIGOPS Operating Systems Review (SOSP), vol. 37, No. 5, Oct. 19, 2003, pp. 29-43.

Gibson, et al., "A Cost-Effective, High-Bandwidth Storage Architecture", retrieved on Nov. 22, 2010 at http://www.pdl.cmu.edu/ftp/NASD/asplos98.pdf>>, ACM, Proceedings of Conference on Architectural Support for Programming Languages and Operating Systems (ASPLOS), San Jose, California, Oct. 1998, pp. 92-103.

(56) References Cited

OTHER PUBLICATIONS

Gobioff, "Security for a High Performance Commodity Storage Subsystem", retrieved on Aug. 26, 2010 at <<http://www.pdl.cmu.edu/PDL-FTP/NASD/hbg_thesis.pdf>>, Carnegie Mellon University, School of Computer Science, Doctoral Thesis, Jul. 1999, pp. 1-222.
Gunaratne, et al., "Managing energy consumption costs in desktop PCs and LAN switches with proxying, split TCP connections, and scaling of link speed", John Wiley & Sons, Ltd.: International Journal of Network Management, vol. 15, No. 5, 2005, pp. 297-310.
Gupta, et al., "Greening of the internet", ACM SIGCOMM 2003 (1-58113-735-4/03/0008), 2003, pp. 19-26.
Gurumurthi, et al.,"DRPM Dynamic Speed Control for Power Management in Server Class Disks". In Proc. International Symposium on Computer Architecture (ISCA 2003), San Diego, pp. 11.
Hamilton, "Resource Consumption Shaping", retrieved on Dec. 31, 2009 at <<http://perspectives.mvdirona.com/2008/12/17/ResourceConsumptionShaping.aspx>>, Dec. 17, 2008, pp. 1-5.
Huang, et al., "Design and Implementation of Power-Aware Virtual Memory", USENIX Annual Technical Conference, 2003, pp. 57-70.
Hunt, et al., "Detours: Binary Interception of Win32 Functions", retrieved on Nov. 22, 2010 at <<http://research.microsoft.com/pubs/68568/huntusenixnt99.pdf>>, Usenix Association, Proceedings of Windows NT Symposium (WINSYM). Seattle, Washington, vol. 3, Jul. 1999, pp. 1-9.
"Industry Report—Digital Lifestyles: 2010 Outlook", retrieved on Apr. 4, 2011 at <<http://www.parksassociates.com/report/digital-lifestyles-2010-outlook>>, Parks Associates, 2010, pp. 1-2.
"Industry Report—Home Networks for Consumer Electronics", retrieved on Apr. 4, 2011 at <<http://www.parksassociates.com/report/home-networks-for-consumer-electronics>>, Parks Associates, 2009, pp. 1-4.
"Intel Centrino Mobile Technology Wake on Wireless LAN (WoWLAN) Feature", Intel Corporation, 2006, pp. 6.
"Intel Corporation, Dual-Core Intel R Xeon R Processor", Intel Corporation , 2004-2006, pp. 104.
Jiang, Parashar, "Enabling Autonomic Power-Aware Management of Instrumented Data Centers", retrieved on Dec. 30, 2009 at <<http://ieeexplore.ieee.org/stamp/stamp.jsp?arnumber=05160976>>, IEEE Computer Society, Proceedings of Symposium on Parallel and Distributed Processing (IPDPS), 2009, pp. 1-8.
Joukov, et al.,"Accurate and Efficient Replaying of File System Traces". In Proc. USENIX Conference on File and Storage Technologies (FAST 2005), 2005, pp. 14.
Kim et al., "Power Management in Disk Storage System with Multiple RPM Levels," ACEED, Mar. 1, 2005, pp. 1.
Kistler, et al., "Disconnected Operation in the Coda File System", retrieved on Nov. 22, 2010 at <<http://www.cs.cmu.edu/~coda/docdir/s13.pdf>>, ACM Transactions on Computer Systems, vol. 10, No. 1, Feb. 1992, pp. 3-25.
Kotsovinos, et al., "replic8: Location-aware data replication for high availability in ubiquitous environments", retrieved on Aug. 26, 2010 at <<http://www.kotsovinos.com/research/papers/replic8.pdf>>, Springer-Verlag Berlin, LNCS vol. 3510, Proceedings of Intl Conference on Wired/Wireless Internet Communications (WWIC), Xanthi, Greece, May 2005, pp. 32-41.
Kravets, et al., "Application-Driven Power Management for Mobile Communication", Wireless Networks, vol. 6, No. 4, 2000, pp. 263-277.
Krishnan, et al., "Thwarting the power-hungry disk", USENIX Winter, 1994, pp. 15.
Kumar, et al., "Single-ISA Heterogeneous Multi-Core Architectures: The Potential for Processor Power Reduction", Proceedings of the 36th International Symposium on Microarchitecture, Dec. 2003, pp. 12.
Li, et al., "EERAID Energy Efficient Redundant and Inexpensive Disk Arrays". ACM,2004, pp. 1-14.
Mayo, et al., "Energy Consumption in Mobile Devices: Why Future Systems Need Requirements-Aware Energy Scale-Down", Hewlett-Packard Company, 2003, pp. 10.
Mazurek, et al., "Access Control for Home Data Sharing: Attitudes, Needs and Practices", retrieved on Nov. 22, 2010 at <<http://lorrie.cranor.org/pubs/chi2010-access-control.pdf>>, ACM, Proceedings of Intl Conference on Human Factors in Computing Systems (CHI), Atlanta, Georgia, Apr. 2010, pp. 645-654.
"Microsoft. Event tracing" <<http://msdn.microsoft.com/en-gb/library/bb968803(VS.85).aspx>> retrieved from the internet on Aug. 12, 2008, 1 page.
Mishra, et al., "Wake-on-WLAN", ACM, 2006, pp. 9.
Mogul, "TCP offload is a dumb idea whose time has come", IEEE HotOS, vol. 9, 2003, pp. 25-30.
"NAND Flash-Based Solid State Disk" Samsung Electronics, 2007, pp. 1-62.
Narayanan, Donnelly, Thereska, Elnikety, Rowstron, "Everest: Scaling down peak loads through I/O off-loading", retrieved on Dec. 30, 2009 at <<http://research.microsoft.com/pubs/68163/Everest-OSDI08.pdf>>, USENIX Association, Proceedings of OSDI, Dec. 2008, pp. 1-14.
News release<<http://www.hp.com/hpinfo/newsroom/press/2007/070625xa.html>>, pp. 1-3.
Olsen, et al., "Multi-Processor Computer System Having Low Power Consumption", Springer-Verlag Berlin Heidelberg, 2003, pp. 53-67.
Ellard, et al., "Passive NFS Tracing of Email and Research Workloads". In Proc. USENIX Conference on File and Storage Technologies (FAST 2003), 2003, pp. 23.
Pering, et al., "CoolSpots: Reducing the Power Consumption of Wireless Mobile Devices with Multiple Radio Interfaces", ACM, 2006, pp. 220-232.
Pering, et al., "Exploiting Radio Hierarchies for Power-Efficient Wireless Device Discovery and Connection Setup", IEEE, 2005, pp. 6.
"Physically Connecting to a Network or Broadband Modem", at <<http://support.dell.com/support/edocs/system/latd820/en/ug/network.htl>>, Dell, 2007, pp. 12.
Pinheiro, et al., "Energy Conservation Techniques for Disk Array-Based Servers". ACM, 2004, pp. 11.
Pinheiro, et al., "Failure Trends in a Large Disk Drive Population". In Proc. USENIX Conference on File and Storage Technologies (FAST2007), pp. 13.
Ramasubramanian, et al., "Cimbiosys: A Platform for Content-Based Partial Replication", retrieved on Nov. 22, 2010 at <<http://research.microsoft.com/pubs/56258/tr-2008-116.pdf>>, USENIX Association, Proceedings of Symposium on Networked Systems Design and Implementation (NSDI), Boston, Massachusetts, Apr. 2009, pp. 261-276.
Ray, et al., "A Spatio-Temporal Role-Based Access Control Model", retrieved on Aug. 26, 2010 at <<http://citeseerx.ist.psu.edu/viewdoc/download?doi=10.1.1.160.3506&rep=rep1&type=pdf>>, Springer-Verlag Berlin, Proceedings of Conference on Data and Applications Security, Redondo Beach, California, 2007, pp. 211-226.
Yao, et al., "RIMAC A Novel Redundancy Based Hierarchical Cache Architecture for Energy Efficient, High Performance Storage Systems". ACM, 2006, pp. 14.
Rodden, et al., "Best of Both Worlds: Improving Gmail Labels with the Affordances of Folders", retrieved on Nov. 22, 2010 at <<http://static.googleusercontent.com/external_content/untrusted_dlcp/www.google.com/en/us/research/pubs/archive/36334.pdf>>, ACM, Proceedings of Intl Conference on Human Factors in Computing Systems (CHI), Atlanta, Georgia, Apr. 2010, pp. 4587-4596.
Rosenblum, et al., "The Design and Implementation of a Log-Structured File System". ACM, 1992, pp. 1-15.
Ruemmler, et al., "UNIX Disk Access Patterns". In Proc. USENIX Winter 1993 Technical Conference, pp. 17.
Sabhanatarajan, et al., "Smart-NICs: Power Proxying for Reduced Power Consumption in Network Edge Devices", IEEE ISVLSI 2008, 2008, pp. 75-80.
Saito, Frolund, Veitch, Merchant, Spence, "FAB: Building Distributed Enterprise Disk Arrays from Commodity Components", retrieved on Dec. 30, 2009 at <<http://www.hpl.hp.com/research/ssp/papers/2004-10-ASPLOS-FAB.pdf>>, ACM SIGARCH Computer Architecture News (ASPLOS Conference), vol. 32, No. 5, Dec. 2004, pp. 48-58.

(56) References Cited

OTHER PUBLICATIONS

Salmon, et al., "Perspective: Semantic data management for the home", retrieved on Nov. 22, 2010 at <<http://www.pdl.cmu.edu/PDL-FTP/Storage/salmon-fast09.pdf>>, USENIX Association, Proceedings of Conference on File and Storage Technologies (FAST), San Francisco, California, Feb. 2009, pp. 167-182.

"SanDisk SSD UATA 5000 1.8", SanDisk Corporation, 2007, pp. 35.

Schneider, "Implementing Fault-Tolerant Services Using the State Machine Approach: A Tutorial", retrieved on Dec. 30, 2009 at <<http://www.cs.cornell.edu/fbs/publications/SMSurvey.pdf>>, ACM Computing Surveys (CSUR), vol. 22, No. 4, Dec. 1990, pp. 299-319.

Schroeder et al., "Disk Failures in the Real World: What Does an MTTF of 1,000,000 Hours Mean to You?" in Proc. USENIX Conference on File and Storage Technologies (FAST2007), pp. 17.

Seltzer, et al., "An Implementation of a Log-Structured File System for UNIX". In Proc. USENIX Winter 1993 Conference, pp. 20.

Seltzer, et al., "Hierarchical File Systems are Dead", retrieved on Nov. 22, 2010 at <<http://www.usenix.org/event/hotos09/tech/full_papers/seltzer/seltzer.pdf>>, USENIX Association, Proceedings of Conference on Hot Topics in Operating Systems (HotOS), Monte Verita, Switzerland, May 2009, pp. 1-5.

Shih, et al., "Wake on Wireless: An Event Driven Energy Saving Strategy for Battery Operated Devices", ACM, 2002, pp. 12.

Simunic, et al., "Dynamic Power Management for Portable Systems", ACM MobiCom 2000, 2000, pp. 11-19.

"SNIA IOTTA Repository", retrieved on Dec. 31, 2009 at <<http://iotta.snia.org/>>, Storage Networking Industry Association, 2008, pp. 1-3.

Sobti, et al., "Segank: A Distributed Mobile Storage System", retrieved on Nov. 2, 2010 at <<http://www.cs.princeton.edu/~rywang/papers/fast04/segank.pdf>>, USENIX Association, Proceedings of Conference on File and Storage Technologies (FAST), San Francisco, California, 2004, pp. 239-252.

Strauss, et al., "Device Transparency: a New Model for Mobile Storage", retrievd on Nov. 22, 2010 at <<http://pdos.csail.mit.edu/papers/eyo-hotstorage09.pdf>>, ACM SIGOPS Operating Systems Review, vol. 44, No. 1, Jan. 2010, pp. 5-9.

Stuedi, et al., "WhereStore: Location-based Data Storage for Mobile Devices Interacting with the Cloud", retrieved on Aug. 26, 2010 at <<http://delivery.acm.org/10.1145/1820000/1810932/a1-stuedi.pdf?key1=1810932&key2=9748082821&coll=GUIDE&dl=GUIDE&CFID=101936225&CFTOKEN=37599229>>, ACM, Proceedings of Workshop on Mobile Cloud Computing and Services: Social Networks and Beyond (MCS), San Francisco, California, Jun. 2010, pp. 1-8.

"TCP Offload Engine", retrieved on Mar. 7, 2008 at <<http://en.wikipedia.org/wiki/TCP_Offload_Engine>>, Wikipedia, 2008, pp. 1-5.

Terry, et al., "Managing Update Conflicts in Bayou, a Weakly Connected Replicated Storage System", retrieved on Nov. 22, 2010 at <<http://citeseerx.ist.psu.edu/viewdoc/download;jsessionid=C655550F24E44FE98C6D7041A8AD77CA?doi=10.1.1.12.7323&rep=rep1&type=pdf>>, ACM, Proceedings of Symposium on Operating Systems Principles (SOSP), Copper Mountain Resort, Colorado, Dec. 1995, pp. 172-183.

Thereska, Donnelly, Narayanan, "Sierra: a power-proportional, distributed storage system", retrieved on Feb. 24, 2010 at <<http://research.microsoft.com/pubs/112503/sierra-TR.pdf, Microsoft Corporation, Microsoft Tech Report MSR-TR-2009-153, Nov. 2009, pp. 1-15.

"Toshiba Leading Innovation", at <<http://www.toshibadirect.com/td/b2c/ebtext.to?page=r400_micro_f, 2007, pp. 2.

van Renesse, Schneider, "Chain Replication for Supporting. High Throughput and Availability", retrieved on Dec. 30, 2009 at http://www.cs.cornell.edu/home/rvr/papers/osdi04.pdf>>, USENIX Association, Proceedings of Conference on Symposium on Opearting Systems Design and Implementation (OSDI), vol. 4, 2004, pp. 91-104.

Wachs, Abd-El-Malek, Thereska, Ganger, "Argon: performance insulation for shared storage servers", retrieved on Dec. 30, 2009 at << http://www.pdl.cmu.edu/PDL-FTP/Storage/argon-fast07.pdf>>, USENIX Association, Conference on File and Storage Technologies (FAST), Supercedes Carnegie Mellon University Parallel Data Lab Technical Report CMU-PDL-06-106 (May 2006), Feb. 13, 2007, pp. 1-16.

Wang, et al., "LOCK: A Highly Accurate, Easy-to-Use Location-based Access Control System", retrieved on Aug. 26, 2010 at <<http://itcs.tsinghua.edu.cn/~yongcai/data/LOCK_of_LoCA09.pdf>>, Springer-Verlag Berlin, LNCS vol. 5561, Proceedings of Location and Context Awareness (Lo-Ca), Tokyo Japan, 2009, pp. 254-270.

Weddle, et al., "PARAID The Gearshifting Power-Aware RAID". In Proc. USENIX Conference on File and Storage Technologies (FAST 2007), 2007, pp. 16.

Whitehead, "Welcome to WebDAV Resources", retrieved on Apr. 4, 2011 at http://www.webday.org, Apr. 2010, pp. 1-4.

"Windows Azure Platform", retrieved on Dec. 31, 2009 at <<http://www.microsoft.com/windowsazure/>>, 2009, pp. 1-2.

"Windows live sync", retrieved on Apr. 4, 2011 at <<http://sync.live.com>>, Microsoft Corporation, 2011, pp. 1.

Yang, et al., "On Effective Offloading Services for Resource-Constrained Mobile Devices Running Heavier Mobile Internet Applications", retrieved on Nov. 22, 2010 at <<http://awin.cs.ccu.edu.tw/magazine/IEEE_com/2008/002.pdf>>, IEEE Communications Magazine, Jan. 2008, pp. 56-61.

Zhum, et al., "Hibernator: Helping Disk Arrays Sleep Through the Winter", ACM, 2005, pp. 14.

Zhu, Zhou, "Power-Aware Storage Cache Management", retrieved on Dec. 30, 2009 at <<http://ieeexplore.ieee.org/stamp/stamp.jsp?arnumber=01407848>>, IEEE Computer Society, Transactions on Computers, vol. 54, No. 5, May 2005, pp. 587-602.

Zhu, et al., "TBBT Scalable and Accurate Trace Replay for File Server Evaluation". ACM, 2005, pp. 2.

\* cited by examiner

DATA STORE INCLUDING A FILE LOCATION ATTRIBUTE

BACKGROUND

Existing file systems store attributes which are associated with a file. These attributes may be defined by the file system, such as file creation time, last modification time and last access time. In addition a file system may allow attributes to be defined by an application developer such that a program can create attributes and these attributes may be referred to as 'extended attributes'.

The embodiments described below are not limited to implementations which solve any or all of the disadvantages of known data stores.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A data store including a file location attribute is described. In an embodiment, the location attribute for a data element, such as a file or database record, is stored with the bytes of data and records the geographic location of the data element. Writing to this attribute is limited to a single trusted entity, such as an operating system, to ensure that the location data can be trusted and when a data element is moved or replicated, the attribute is updated to reflect the new location of the data element. This location data is made available to users and applications by a metadata service which tracks the locations of data elements and responds to requests from users. Access control policies can been defined in terms of location and stored at the metadata service and the metadata service can then enforce these policies when responding to requests.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
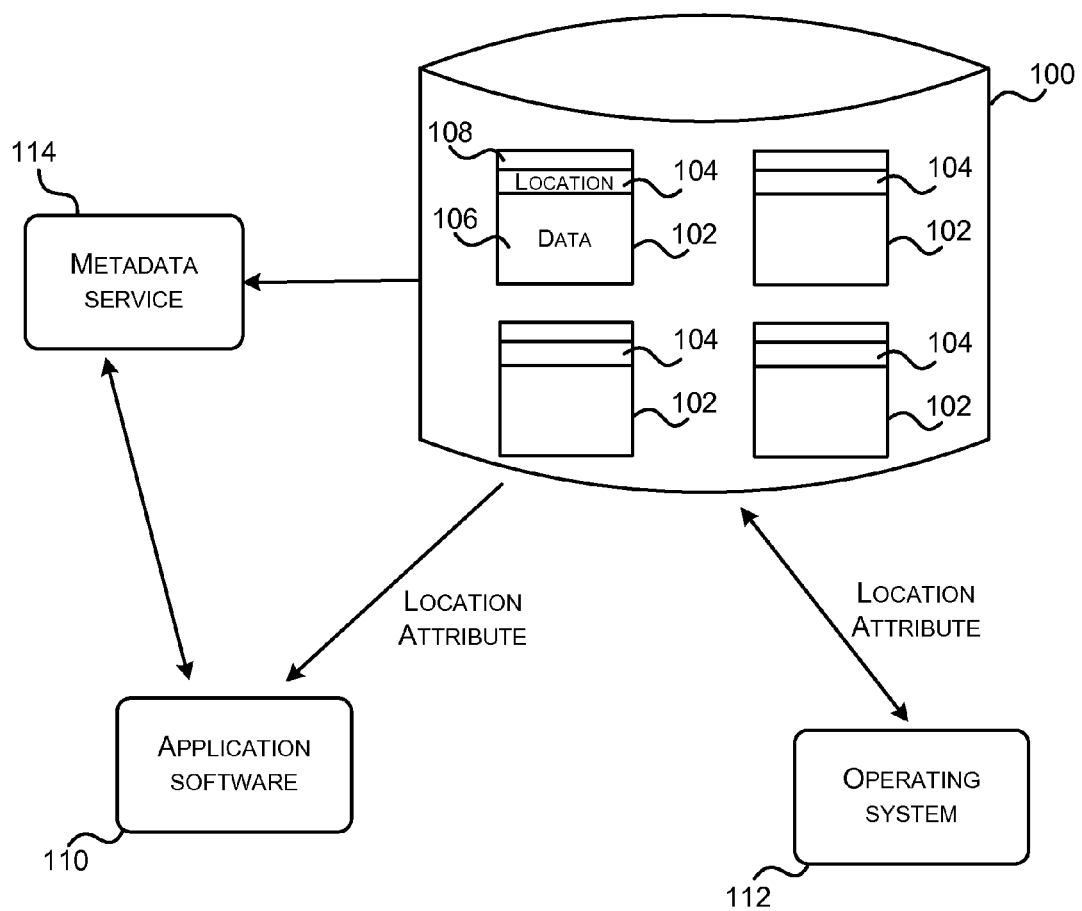
FIG. 1 is a schematic diagram of a data store in which each data element has an associated location attribute.

FIG. 1 is a schematic diagram of a data store 100 (e.g. a file system or database) in which each data element 102 (e.g. a file or database record) has an associated location attribute 104 which is stored within the data store 100 and is co-located with the bytes of data 106 themselves. The location attribute 104 comprises data which is representative of the geographical location of the data element and may be in any format. Users may assign aliases to this data, for example, so that a location attribute of '0xff4566' means 'home'. This location attribute 104 is set so that it can only be written (e.g. set and updated) by a single trusted entity in a similar manner to existing attributes 108 such as the file length, creation time and last modification time. This single trusted entity is not a user or application software 110 and in many embodiments is an operating system 112. In other examples, the single trusted entity may be another piece of software which has been authorized/validated by the operating system in some way and the where the path between the piece of software and the location storage field is a 'secure path' (e.g. using appropriately hard encryption and hardware protection to avoid the program code being subverted) and consequently the piece of software may be considered trusted software. Application software 110 can read a location attribute 104 but cannot set or edit the attribute.

The location attribute 104, as described above, is a tightly bound attribute which is inviolable. Native support for this attribute is provided in the data store (e.g. file system or database). When a data element is moved or replicated, the attribute moves with the data element and is updated by the single trusted entity (e.g. the operating system) and consequently replicas are now not an exact copy of the original data element because the location attribute is different. The restriction in relation to which entities can write the location attribute provides a high level of authenticity and the location information can therefore be trusted and used by many different applications for many different purposes, as described in more detail below.

In an example, the data store may be an NTFS file system and the location attribute may be added to existing attributes, which in NTFS are referred to as 'Attribute Types' to distinguish them from 'FileAttributes' which are flags that can mark the file as read only/hidden/compressed etc (and are a subset of the possible attributes a file may have). Examples of existing attribute types in NTFS with the addition of the new attribute type, $FILE_LOCATION, are shown in the table below:

| Attribute Type | Description |
| --- | --- |
| $STANDARD_INFORMATION | General information about the file (which includes Creationtime, LastModificationTime, LastChangeTime, and LastAccessTime) |
| $FILE_NAME | Name of the file |
| $SECURITY_DESCRIPTOR | Security information about the file |
| $DATA | Data in the file |
| ... | ... |
| $FILE_LOCATION | Geographical location of the file |

In another example, the data store may be an SQL Server® and in such an example, each database record may have an extra 'location' column as shown in the example table below:

| Column 1 | Column 2 | ... | Column n: Record location |
|----------|----------|-----|---------------------------|
|          |          |     |                           |

It will be appreciated that although each data element has an associated location attribute which identifies a geographical location of the data element, in some systems the location attribute may not be explicitly specified such that the location attribute may be left blank or filled with a default or null value. A particular value for the location attribute may be used to indicate that the geographical location is not known and this may be the same as, or different from, the value which is used in systems which do not actively use the location attribute.

The system shown in FIG. 1 also comprises a metadata service (MDS) 114 which may be separate from the data or co-located with the data. The MDS provides access to the location information (stored as the location attribute) for applications or other users of the data, as described in some of the examples given below. The MDS may therefore store location information for each data element which corresponds to the location stored in the location attribute. When the location of a data element changes and the location attribute is updated, this change may be propagated to the MDS by the data store (e.g. the data store may provide updates to the MDS periodically, e.g. every 10 seconds) or alternatively the MDS may periodically poll the data store to confirm location information. The MDS may therefore be described as tracking locations of files and receiving location requests from users. Where the location attribute is mirrored in an MDS 114 which is separate from the data, the location attribute 104 stored with the data may be referred to as the 'primary location attribute'.

In the examples above, there is a separate location attribute for each data element 102 and the location attribute forms part of the file/record itself; however, in some examples, a location attribute may reside within the data store general metadata such that a collection of data elements have the same associated location attribute (such that each data element still has an associated location attribute but there is not a 1:1 relationship between data elements and location attributes). Where a user has many data elements (e.g. files) and the data elements are very mobile (i.e. they change geographical location frequently), it may be more efficient to use this approach as instead of updating the location attribute of each data element, the location attribute of the collection is updated.

In order that an application can retrieve the location information for a data element, a new API (application programming interface) call GetFileGeoLocation may be used and an example of such an API call is given below:

```
DWORD WINAPI GetFileGeoLocation(
    _in HANDLE hFile
);
```

The input parameter to the API call is hFile[in] which is a handle to the file and the return value of the function is the geographical location of the file (as stored as the location attribute). Such an API provides a well defined interface which enables applications and services to access the location attribute but not to manipulate it.

There are many applications in which the location attribute described above may be used given that the attribute provides location information which is secure and trustworthy. Applications include access control, performance optimization and services which use location and, as described in more detail below, some of these applications use user location as an additional parameter (in addition to the data location). Depending on the level of granularity required in a particular application, the user location may be determined based on different technologies and in some examples a user may have a location sensor which is specific to them (e.g. a GPS receiver in their mobile phone) whereas in other examples, user location may be determined based on nearby (and possibly fixed location) sensors. In an example, triangulation in 3D space using wireless/near-field technologies may be used to determine a user's location in a fine-grained manner and this may be useful for applications such as providing location based access control for an open plan area where wireless signals might propagate unimpeded by physical barriers. In another example, software defined radio or Ultra Wide Band (UWB) radio may be used to determine the proximity of physical barriers and so aid in sensing the physical location of a user. In other examples any other form of location sensor technology may be used (e.g. camera and microphone sensor technology or technology such as Kinect™) and this may be coupled with other technologies such as object recognition, QR barcodes etc, to provide location identification.

Where user location is a parameter, APIs such as the ReadFile/WriteFile APIs may be augmented with a parameter UserLocation which then passes the geographical location of a user. Unlike the location of data which is stored with the data in the form of the location attribute, the user location may be a dynamic parameter which is determined when required (e.g. upon request or when the API requires it as an input parameter). In another example, however, the user location may be stored in a similar manner to the data location through use of a special 'user file' which is stored in the data store and has a location attribute which identifies the location of the user rather than the location of the user file data. In addition, or instead, the user location may be stored in the MDS and periodically updated/checked (e.g. the MDS may track users in the same or a similar manner to its tracking of data elements).

Figure 2:
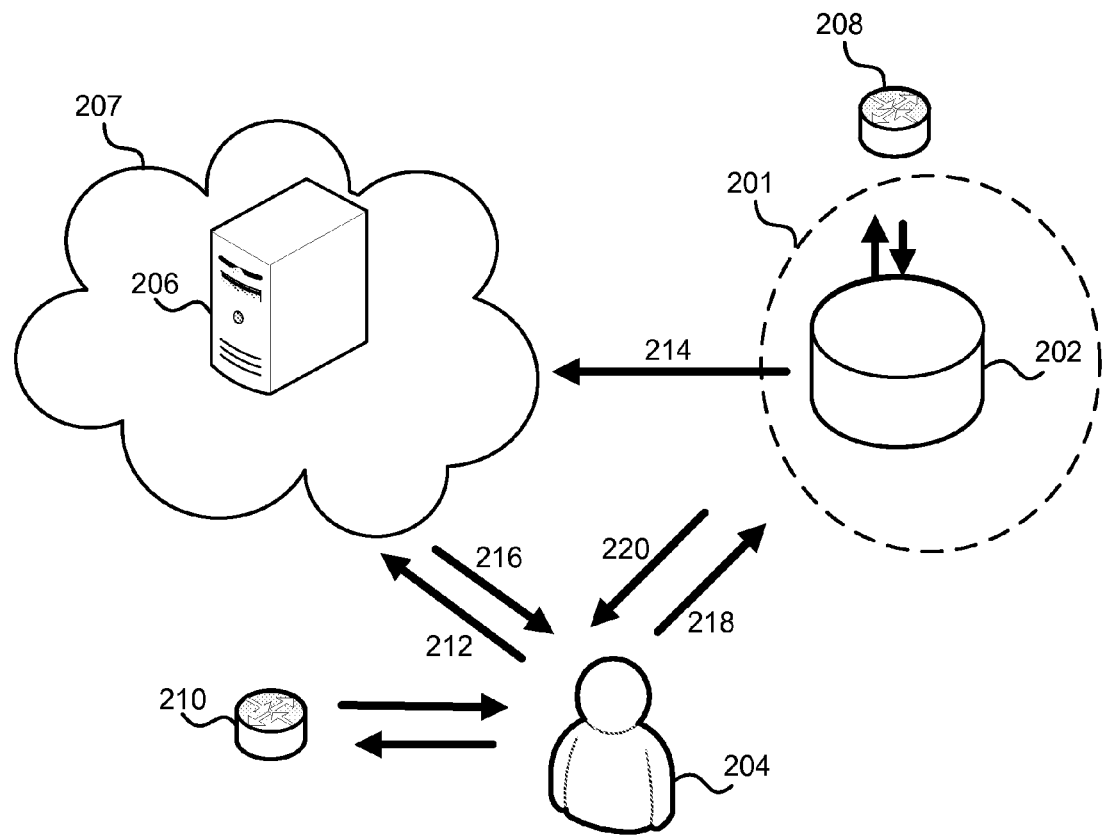
FIG. 2 is a schematic diagram of a system architecture in which the data store includes a location attribute.

FIG. 2 is a schematic diagram of a system architecture in which the data store includes a location attribute (as described above) and FIG. 3 is a flow diagram of a method of operation of the system which provides location based access control. The system comprises a data store 201 which stores data elements 202 which may be file, record containers etc, a user 204 (where the term 'user' is used to refer to a user client-side library and not to the human user themselves) and a metadata service 206, which in this example is shown separate from the data store 201 (for example residing on the cloud 207) but is able to communicate with both the data store and the user. As described above, in other examples (e.g. NTFS), the MDS may be co-located with the data element 202. In this example, both the data element 202 and the user 204 are shown to have an associated location sensor 208, 210, however this may represent any local physical or virtual sensor package that allows the user and the data element 202/data store 201 to reliably and securely discover their current location in physical space with some degree of accuracy, (e.g. a triangulation of visible WiFi access points might indicate the user is located within a 10m logical sphere, a physical attachment to a GPS device or USB cable may indicate another physical location etc.).

In many applications, the interaction between the user/data element/data store and the sensor is secure and time sensitive (i.e. cannot be corrupted or masqueraded) and the sensor is secured/trusted to give a true location indication. Public key encryption and signing of messages between devices/sensors with trusted platform modules (e.g. PC Palladium chips) may be an example solution for gaining this level of trust.

For a user to access a data element, the user 204 makes a request to locate the data element 202 to the MDS 206 (block 302, as indicated by arrow 212 in FIG. 2) and this request contains the location of the user (as determined using sensor 210). The MDS 206 is responsible for periodically keeping track of the location of the data element 202 (e.g. this could be implemented using heartbeats as shown by arrow 214 in FIG. 2), but the information held by the MDS may be out of date (e.g. the data element may have moved somewhere else). Having received a user request (in block 302), the MDS makes a decision based on at least one of the stored location of a data element and a location of the user. In this specific example shown in FIG. 3, the MDS determines whether the access control policy for the data element requested allows for the user to access it based on the stored location of the data element and/or the current location of the user (block 304). If the access control policy is met ('Yes' in block 304), the MDS responds with an appropriately signed response to indicate how the user can contact the data element/data store, e.g. in the form of an IP address for the data element/data store (block 306 and arrow 216). This appropriately signed response may be in the form of a token which may, in some examples, be cached by the user (where, as described above, this is not intended to refer to the human user themselves but instead to a user client-side library). The user can then make an access request to the data element/data store (block 308 and arrow 218) and in return receive the requested data (block 310 and arrow 220). If the result of the decision regarding the access policy (in block 304) is 'No', access is denied (block 316).

Figure 3:
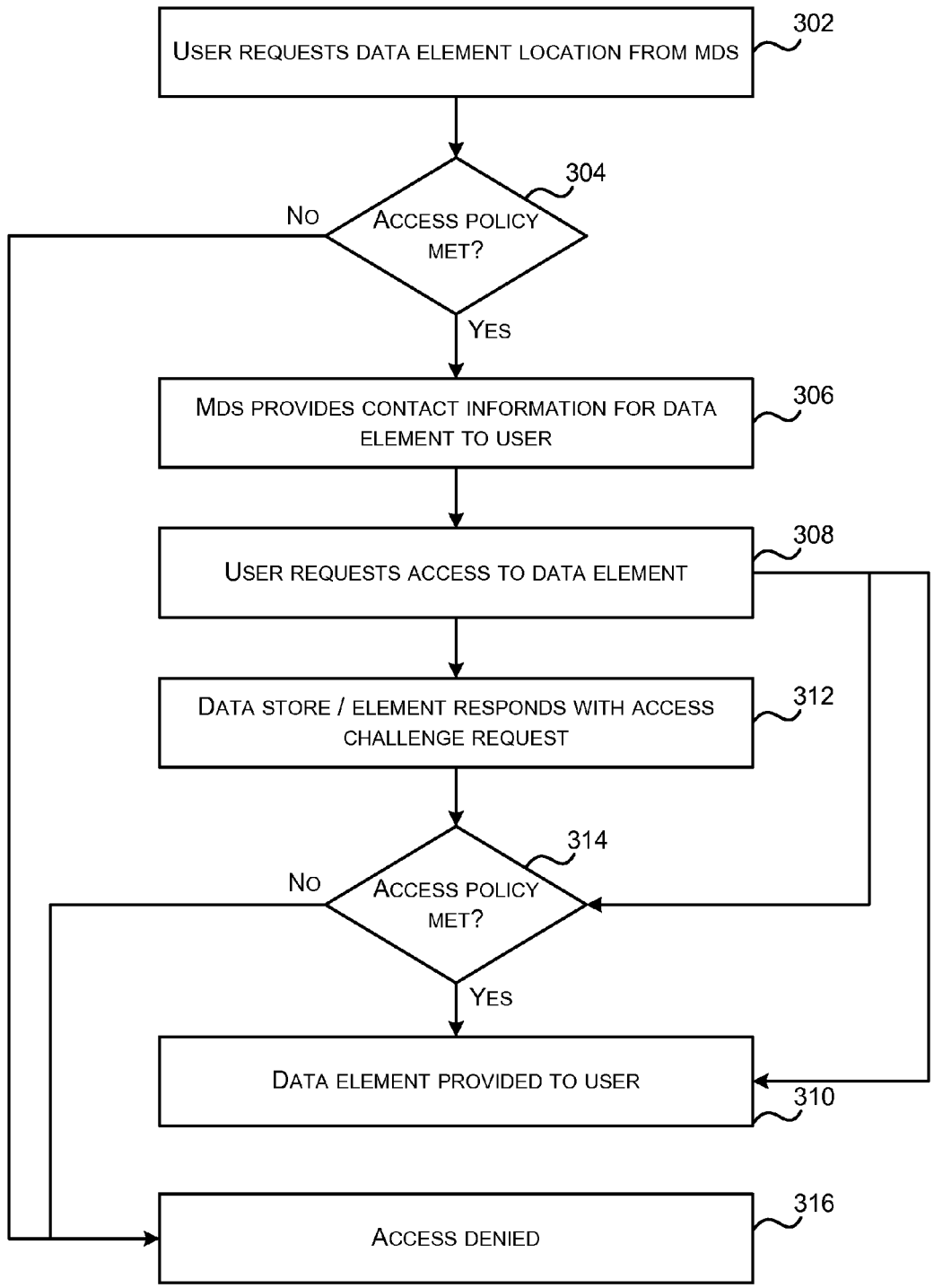
FIGS. 3 and 4 are flow diagrams of example methods of operation of the system shown in FIG. 2.

In a variation of that shown in FIGS. 2 and 3 and where the operating system cannot access the MDS but still wants to provide local location based access control, a scheme for proxy location management may be used. Such a scheme may use similar techniques to permission proxying/temporary security token acquisition from a trusted authority and the MDS may be delegated to the local system or the function of the MDS may be delegated to a different MDS.

In some examples, the data element/data store may also perform the access control policy (determined in block 314), since it knows its exact state (the MDS might have a stale position). In such an example, the data element/data store may respond with an access challenge request (block 312), which may incorporate the data element's location as reliably determined by the local sensor 208. This may be in the form of a signed message from the data element/data store using the data element/data store and the local sensor's private keys. If the access control policy is not met ('No' in block 314), e.g., if either the user or the data element has moved to a new location since the last time the user contacted the MDS (for example if the user provides a cached access token that incorporates an old location of the data element), the user will be denied access (block 316). The user will then have to go back to the MDS to obtain a new token (e.g. in a repeat of blocks 302, 304 and 306) before it will be able to access the data element and this will only be successful where the token is issued after the location has been updated in the MDS (which may take several seconds where heartbeats are used).

In the examples described above, the credentials for security access are presented to the verification agent by the principal who wishes to gain some particular access control. This has the effect that the data element does not need to understand the infrastructure for trusting entities (which, for example, it would need to do if instead, the data element performed access control based on its known location without responding with an access challenge request in block 312) and means that the data element is a more passive entity.

In the methods described herein, the operating system handles location information. This has the effect that an application does not have to constantly verify its location before each data read but instead (as shown in FIG. 3) presents a set of credentials gained from the MDS when it last checked on location access control. If these credentials are out of date or wrong for the current location, the operating system will escalate this via an access control error message to the application.

In the example shown in FIGS. 2 and 3, the access control is based on the locations of both the user and the data element; however in other examples and other applications (e.g. performance optimization/proximity service) just one entity's location (the user or the data element) or both may be taken into consideration. The authentication request to allow or deny access to the resource may be initiated by either the user or the data element/data store and is only reliant on one of these entities realizing a need to interact with the other based on their location.

In an example application where the access control policy is only defined in terms of the location attribute of the data elements, confidential project files may be restricted so that they can only be accessed from a particular location (e.g. certain secure offices within a building). The physical disks containing the files themselves could then be moved between locations at will, but would not be accessible in transit or in other locations. Such an access control policy would prevent third party access to data if the data was misplaced in transit between locations (e.g. if accidentally left on a train).

The system and method shown in FIGS. 2 and 3 may also be generalized to a case where there are multiple users and/or resources. If there are multiple users, the location of all of them could be sent to the metadata service through the APIs. This allows, for example, applications that can access data only if a group of users are physically close by or only if one of the users is close by and other users are more than a specified distance away etc.

The access control policy used may be of any form and may be defined in terms of absolute location, e.g. the user can only access a data element from a particular location and/or the data element can only be accessed when stored in a particular location, or in terms of relative location, e.g. the user can only access the data element when they are in the same location or a group of users (or one of the group) can only access a data element when they are all close by or when they are physically separated. In an example, a pupil may bring homework files home on a USB stick and an access control policy may be set such that the files can only be accessed when the location of both the files and the user are "home". In another example, guests to a house who are located in the living room may be allowed to access to digital pictures stored on the home network (or any other data set which is defined) without the need for a password or requiring the host to set specific read-write permissions on every file. In a third example, files relating to games (e.g. pub quizzes) may be restricted so that they are only accessible in the location where the game is to be played (e.g. in the pub) to prevent cheating.

In addition to, or instead of, using the location attribute to specify access permissions, the attribute may be used to control where data elements can be stored, which may be referred to as a data placement policy. The data placement policy specifies the permitted and/or not permitted storage locations for the data element (e.g. the data element can only be stored in the UK, the data element must not be stored outside of the USA etc) and therefore defines allowed values of the location attribute. The data store (or metadata service) can then control placement of data elements and any replicas to ensure the policy is satisfied (i.e. storage of a data element is controlled in accordance with the data placement policy). A data placement policy may be used for security, for performance optimization or for other reasons and various examples are described below.

The use of a data placement policy in combination with the location attribute described above may be particularly useful in distributed or cloud based data storage where the servers may be geographically distributed and users or organizations may wish to restrict movement of their data. Alternatively, an organization could use an access control policy such that although data could be stored in 'non-preferred' locations, it could only be accessed when stored in a 'preferred' location, as described above. A data placement policy may be used to prevent theft of data: if a sensitive file is created with a geographical location indication that it can only be stored in location A and a malicious user attempts to transfer the file to location B, this will be prevented.

The following example shows a CreateFile call in which both an access control policy and a data placement policy have been instantiated through two optional parameters, lpSecurityAttributes and dwDesiredGeoLocation respectively.

```
HANDLE WINAPI CreateFile(
    __in       LPCTSTR lpFileName,
    __in       DWORD dwDesiredAccess,
    __in       DWORD dwShareMode,
    __in_opt LPSECURITY_ATTRIBUTES lpSecurityAttributes,
    /* access policy */
    __in       DWORD dwCreationDisposition,
    __in       DWORD dwFlagsAndAttributes,
    __in_opt HANDLE hTemplateFile,
    __in_opt DWORD dwDesiredGeoLocation /* data placement
    policy */
);
```

Although the parameter in the above example which implements an access policy is referred to as a security descriptor, the location attribute and the control of access based on location may be performed for reasons other than security and one example is performance optimization. For example, where multiple replicas of a data element are stored in a system (e.g. a user may have two replicas of a music file, one at home and one in the cloud), the data store may determine which replica to read dependent on the current location of the user and this choice may be based on many factors such as network traffic costs, latency or security reasons.

Figure 4:
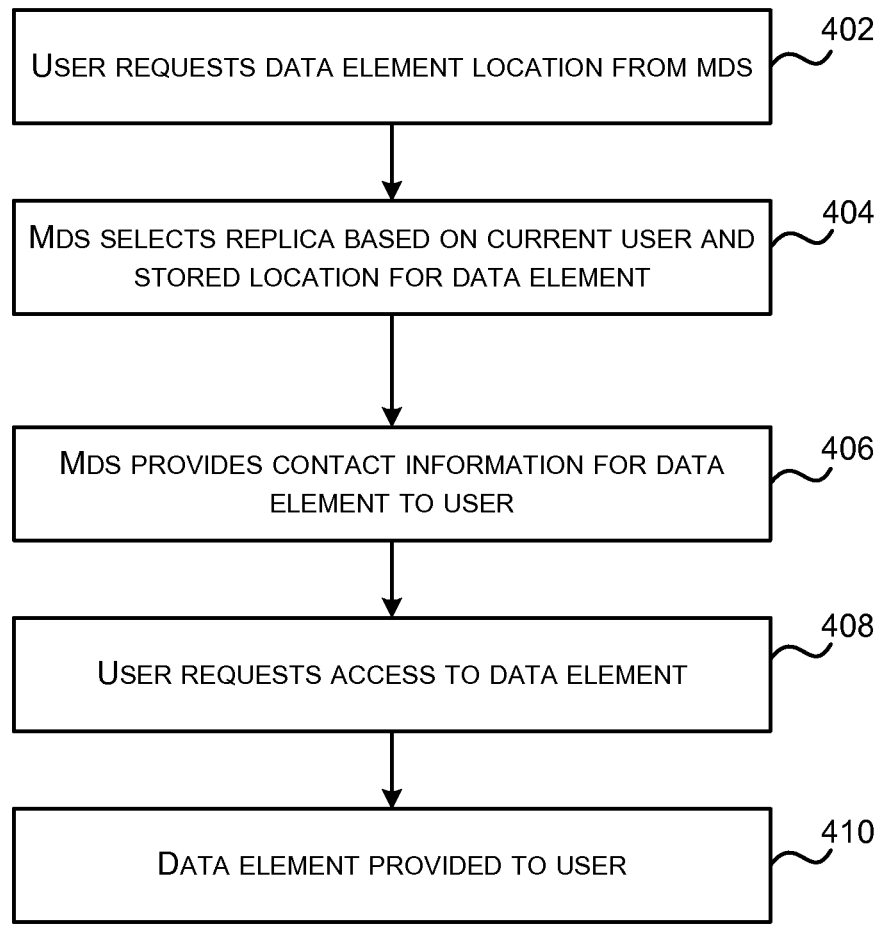

Referring to the architecture shown in FIG. 2, FIG. 4 is a flow diagram of a method of operation of the system which provides performance optimization. The user 204 makes a request to locate the data element 202 to the MDS 206 (block 402, as indicated by arrow 212 in FIG. 2) and this request contains the location of the user (as determined using sensor 210). The MDS 206 is responsible for periodically keeping track of the location of the data element 202 and any replicas. As described previously with respect to FIG. 3, having received a user request (in block 402), the MDS makes a decision based on at least one of the stored location of a data element and a location of the user. In this specific example shown in FIG. 4, the MDS uses the user location data (received in block 402) to identify the most appropriate replica for the user to access (block 404) and then responds with an appropriately signed response to indicate how the user can contact the identified replica of the data element e.g. in the form of an IP address for the data element/data store (block 406 and arrow 216). The user can then make an access request to the data element/data store (block 408 and arrow 218) and in return receive the requested data (block 410 and arrow 220).

Figure 5:
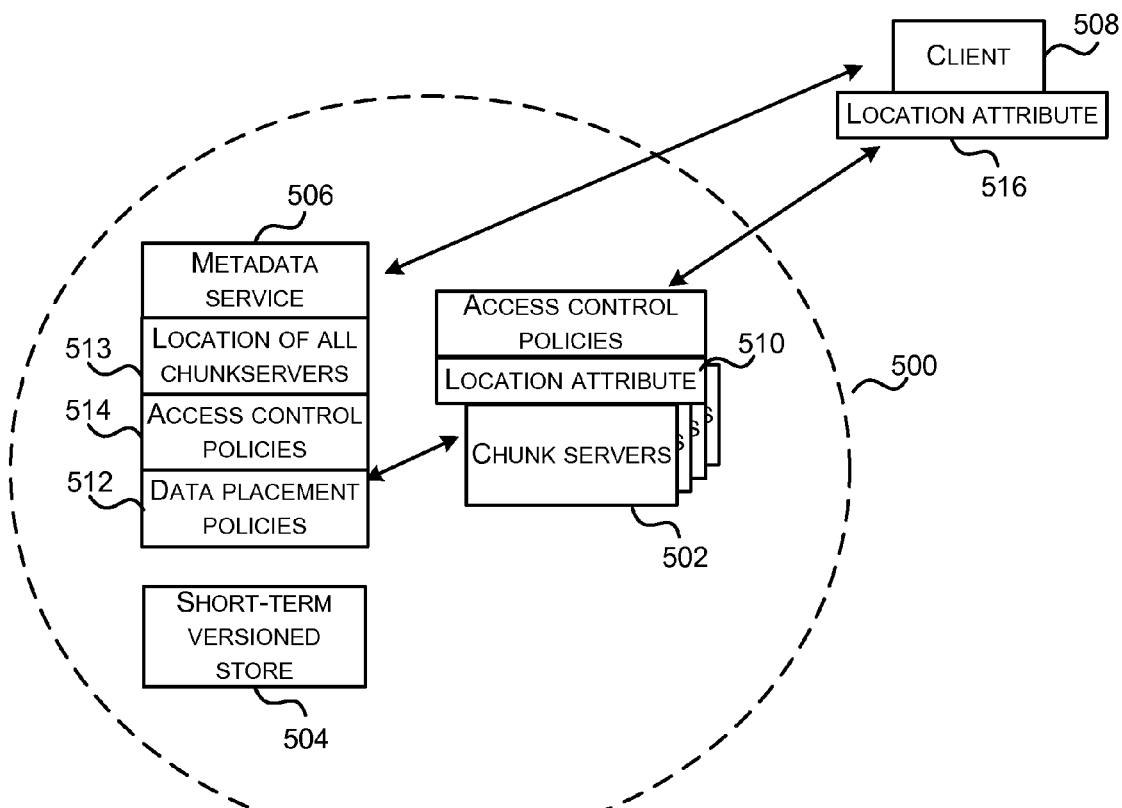
FIG. 5 is a schematic diagram of a storage system.

Another example involving replication can be described with reference to FIG. 5. FIG. 5 is a schematic diagram of a storage system 500 which comprises a number of servers 502, a short-term versioned store 504 and a metadata service 506. The servers 502 are connected by a network (not shown in FIG. 5) which also connects them to the short-term versioned store 504 and the metadata service 506. The arrows in FIG. 5 represent some of the communication paths within the system; however, it will be appreciated that messages and data may flow in directions not shown in FIG. 5. In an embodiment the servers 502 are geographically co-located and the network which interconnects them may be a low latency network. This storage system is a variation on the storage system described in co-pending U.S. patent application Ser. No. 12/714,223 entitled 'Reducing Power Consumption of Distributed Storage Systems' (filed 2 Feb. 2010) which is incorporated herein in its entirety.

The system 500 provides read/write access to data objects in units of chunks, where the chunk size is a system parameter (e.g. 64 MB or 1 MB) and consequently the servers 502 may be referred to as 'chunk servers'. These chunk servers may be any form of device which can operate as a server including, but not limited to, PCs, laptop computers or smartphones. Write requests may overwrite existing data and/or append new data and client read and writes may be for arbitrary byte ranges within a chunk. A number, r, of blocks of data derived from a chunk are stored in the system, with derived blocks being stored on different chunk servers 502. In an embodiment of the system which uses replication, each block of data derived from a chunk comprises a replica of the chunk and each of the replicas may have different location attributes 510. There are many ways that chunks may be assigned to chunk servers at chunk creation time; however, where a data placement policy 512 is defined (e.g. as described above, the data location specification can be sent to the MDS through the CreateFile API), the MDS 506 ensures that a file and its replicas are only placed in chunk servers in the desired location(s) using the chunk server location information 513 which is stored at the MDS 506. This location information 513 may be provided through periodic heartbeats and location updates, as described above in relation to FIG. 2.

At times of reduced system load, the number of active blocks of data derived from a chunk (e.g. the number of replicas) may be reduced (e.g. from r blocks to less than r blocks) and those servers in the system which do not store any active blocks are put into a low power state. The system load may be defined in terms of I/O requests and may be determined using predictions (e.g. based on historic load data) and/or measurements of current system load. Putting a subset of the servers in the system into a low power state reduces the power consumption of the system; however, the servers which are in a low power state are unavailable for servicing read and write requests. If at least one replica of a chunk remains active, this can be used to service any read requests received, but if all replicas are inactive, there will be delay while a server exits the low power state (a process which may be referred to as 'waking up') before the request can be serviced. If a write request is received for a chunk of data at a time when some of the servers are unavailable, the write is stored in the versioned store 504.

For a given chunk, one of the active replicas of a chunk (e.g. one of the replicas) is denoted as the primary at any given time with the other replicas being secondaries and over time the replica which is denoted as primary may change. At any time a chunk server will be the primary for some of the chunks stored on it (i.e. where the chunk server stores a replica of the chunk which is currently considered the primary) and a secondary for the others (i.e. where the chunk server stores a secondary replica of the chunk). Client read and write requests for a particular chunk (or portion thereof) are sent to the primary chunk server which determines request ordering and ensures read/write consistency. The term 'primary' may be used herein to refer to either the replica which is currently denoted as primary or to the chunk server which holds the replica which is currently denoted as primary. The system may be load balanced by spreading a large number of chunks substantially uniformly over a smaller number of chunk servers and by choosing the primaries for each chunk substantially randomly from the available replicas (e.g. replicas) of that chunk.

The short-term versioned store 504 is used to store writes (which may be to the whole of or a part of a chunk) when the system is operating in a lower gear and one or more chunk servers are unavailable (because the chunk server is in a low power state). A write (or each write) for a particular chunk has associated version information such that multiple writes for a portion of a chunk can be accommodated and the store 504 maintains substantially the same fault tolerance for data stored in the store compared to data stored in a chunk server, e.g. by storing r copies of a write in different locations within the store or by use of error correction techniques (e.g. erasure codes). The short-term versioned store may use the same coding used by the chunk stores (e.g. they may both use replication or erasure coding) or different coding may be used (e.g. the chunk stores may use erasure coding and the short-term versioned store may use replication). When all the chunk servers are available, data written to the store 504 is transferred to the chunk servers 502 (in a process which may be referred to as 'reclaim') and once this is completed, the data in the store can be deleted.

The MDS 506 (which may be a centralized metadata service) functions as a naming service and maps an object (such as a file) to its constituent chunks. The metadata service 506 holds location information 513 for all of the chunk servers (as described above) and also records the location of replicas of a chunk (e.g. of each replica of a chunk), details of the primary and may also track chunk server availability. Other functions of the metadata service may include reassigning primaries as necessary and initiating recovery actions when a server fails permanently. The metadata service 506 is not on the data path between clients 508 and chunk servers 502 and the state of the metadata service is updated when chunks are created or deleted but does not need to be updated when they are read or written. In an example, the MDS may be implemented as an in-memory, deterministic state machine which can be replicated for high availability using state machine replication techniques.

Figure 6:
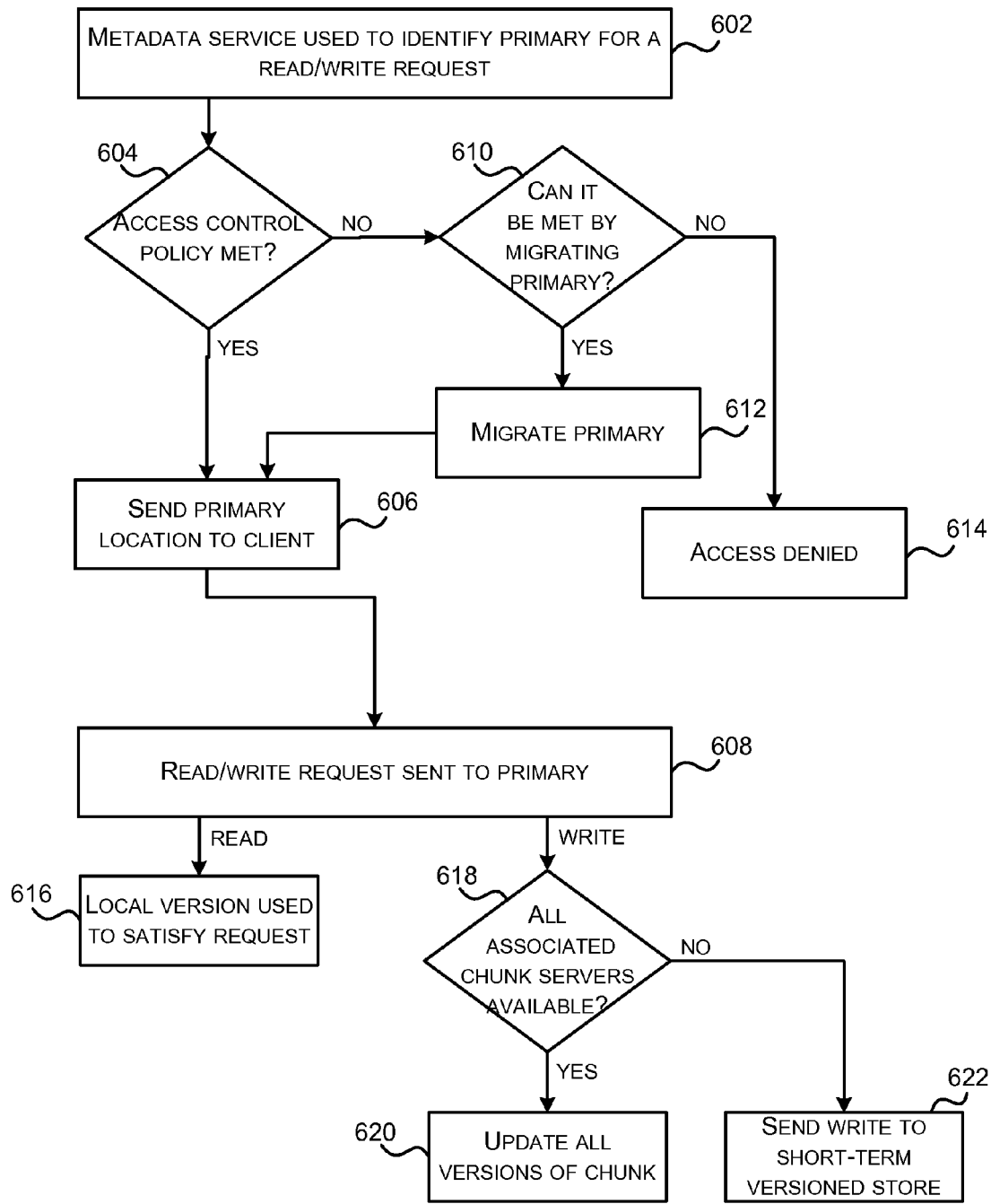
FIG. 6 is a flow diagram of an example method of operation of the system shown in FIG. 5 in response to read and write requests received from a client.

The operation of the system of FIG. 5 in response to read and write requests received from a client 508 can be described with reference to FIG. 6. When a client 508 has a read or write request, the metadata service 506 is used to identify the relevant primary chunk server (or multiple primary chunk servers, where the request relates to multiple chunks), e.g. the chunk ID and primary chunk server location (block 602). Where an access control policy 514 has been defined, it is determined whether the access control policy is met (in block 604) based on the location of the primary and/or the location of the client 508 (as stored in the client location attribute 516). The client location may be provided to the MDS 506 in the ReadFile/WriteFile API (as described above). If the access control policy is met ('Yes' in block 604), the MDS sends details of the primary location to the client (block 606) and the client 508 can then send the read/write request to the primary chunk server (block 608).

If, however, the access control policy is not met ('No' in block 604), the MDS 506 determines if the policy could be met if the primary was migrated from the current chunk server to one of the secondary chunk servers and if so ('Yes' in block 610) the primary is migrated (block 612). The primary may be migrated using the following protocol for the chunk C for which S is a primary:

The MDS signals S to initiate primary migration;
S updates its in-memory state to mark itself as a secondary for chunk C. An error will be returned on future client requests. Client requests currently in flight will complete normally;
S signals the MDS with released primary(C);
The MDS modifies its internal state to reflect the new primary, S', as identified in block 610 as satisfying the access control policy;
The MDS signals S' with become primary(C); and
S' initializes any required in-memory state and starts servicing client requests as the primary for C.

Using this protocol, the window of unavailability for chunk C is one network round trip plus the time required to update MDS state and initialize the new primary on S'. If a client accesses C during this short window it will retry the operation first by obtaining the new metadata from the MDS. This protocol converts this temporary unavailability into a higher latency.

Once the primary has been migrated (in block 612), the MDS sends details of the primary location to the client (block 606) and the client 508 can then send the read/write request to the primary chunk server (block 608). If, however, the MDS determines that migrating the primary will not allow the access control policy to be satisfied ('No' in block 612), then the read/write request is rejected (block 614).

Where the client application is able to send a read/write request to the primary (block 608), in the case of a read request, the primary chunk server uses a local replica of the chunk to satisfy the request (block 616). In the case of a write request and where all the chunk servers storing replicas of the relevant chunk are available ('Yes' in block 618), all replicas of the chunk stored on the different chunk servers are updated with the write (block 620). If however, not all the chunk servers are available ('No' in block 618), i.e. a chunk server is in a low power state or has failed, the write is written to the short-term versioned store 504 (block 622). This data written to the short-term versioned store (in block 622) is subsequently reclaimed and written to the chunk servers when they are all available.

Availability of chunk servers may be tracked through periodic heartbeats sent from chunk servers 502 to the MDS 506. In response to a heartbeat, the MDS sends the chunk server a lease for the set of chunks that it is currently the primary for, and details of the locations of the secondaries for those chunks (i.e. details of the chunk servers which store the secondary replicas). Leases are set to expire before the MDS times out the heartbeat, and servers send fresh heartbeats before their leases expire. The MDS reassigns primaries on demand for chunks whose primaries have lost their lease. A chunk server with an expired lease will return an error to a client trying to access data on it; after a timeout period the client fetches and caches the new chunk metadata from the MDS.

In an example, there may be two replicas available for a chunk which a client wants to access. One, R1, may be physically stored at the home PC and the other, R2, may be stored on a work PC and may be the primary. If the access policy 514 is such that a user should only read the replica at home, the primary will need to be migrated from replica R2 to R1 before the user can read the data.

In another example of a performance optimization which is enabled through the use of a location attribute associated with a data element, if data is written to a data store which is distant from the user/client, the client can decide to compress the data before sending it to the data store. The location information is provided to the client by the MDS, e.g. as described above with reference to FIGS. 2-4.

In a further application of the location attribute, services may be enabled which use the location information. In an example, a file sharing application may only allow sharing of a file between users which are close by (e.g. two siblings at home) and if the data will remain close by (e.g. a user will not copy the data onto the cloud or email it to a friend). This example therefore uses both the location attribute for the data and the user location.

Figure 7:
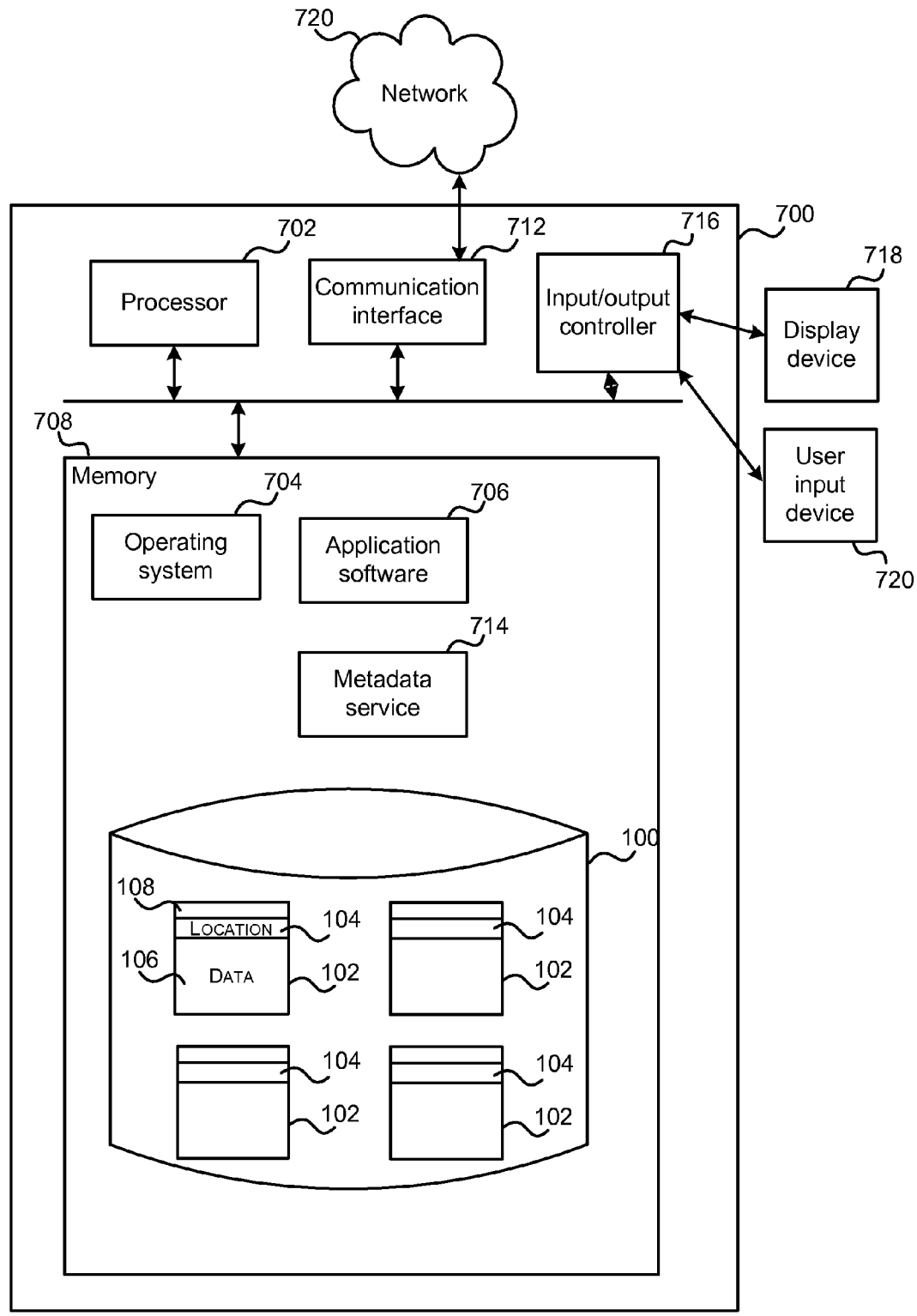
FIG. 7 illustrates an exemplary computing-based device in which embodiments of the methods described herein may be implemented.

FIG. 7 illustrates various components of an exemplary computing-based device 700 which may be implemented as any form of a computing and/or electronic device, and in which embodiments of the methods described herein may be implemented. The computing-based device 700 may be a data storage system or data store and may for example, be a laptop, server or other computing device.

Computing-based device 700 comprises one or more processors 702 which may be microprocessors, controllers or any other suitable type of processors for processing computing executable instructions to control the operation of the device in order to write location attributes for data elements stored in the device and to implement any access control or data placement policies which may be defined. In some examples, for example where a system on a chip architecture is used, the processors 702 may include one or more fixed function blocks (also referred to as accelerators) which implement a part of the method of writing and/or managing location attributes in hardware (rather than software or firmware). Platform software comprising an operating system 704 or any other suitable platform software may be provided at the computing-based device and in some examples, this platform software may enable application software 706 to be executed on the device.

The computing-based device 700 comprises a data store 100 for storing data elements 102 where each data element has an associated location attribute 104 which is stored in the same location as the data element and in some examples may be part of the data element or part of the general metadata of the data store.

The data store and the computer executable instructions may be provided using any computer-readable media that is accessible by computing based device 700. Computer-readable media may include, for example, computer storage media such as memory 708 and communications media. Computer storage media, such as memory 708, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 708) is shown within the computing-based device 700 it will be appreciated that the storage may be distributed or located remotely and accessed via a network 710 or other communication link (e.g. using communication interface 712).

As described above, the location attribute information can only be written by a single trusted entity, such as operating system 704. The location information may be provided to other entities (such as application software 706) by a metadata service 714. The communication interface 712 may be arranged to receive requests from remote clients or users for location information and these requests are handled by the metadata service 714.

The computing-based device 700 may also comprises an input/output controller 716 arranged to output display information to a display device 718 which may be separate from or integral to the computing-based device 700. The display information may provide a graphical user interface. The input/output controller 716 is also arranged to receive and process input from one or more devices, such as a user input device 720 (e.g. a mouse or a keyboard). This user input may be used to interact with the operating system and application software but a user cannot write to the location attribute 104. In an embodiment the display device 718 may also act as the user input device 720 if it is a touch sensitive display device. The input/output controller 716 may also output data to devices other than the display device, e.g. a locally connected printing device (not shown in FIG. 7).

The examples described above provide a data store which includes a file location attribute. Existing data stores, however, do not incorporate the geographical location of a user or of the data itself Certain current network protocols and devices (e.g. firewalls) are location-aware, for example network-based access control ensures that files within an organization's firewalls are only accessible from within the organization. However, such policies are very coarse-grained (they either allow or prevent access to all files) and are easy to circumvent (e.g. by copying a file onto a portable memory device and transporting it outside the organization). Some systems provide services or access control based on location and such services or access control are managed by application software which obtains and tracks location information and can manage user access to data/services based on the location information. Such systems, however, do not provide a high level guarantee of authenticity of the location information as the information may be modified by a user or third party. Some applications are also location-aware, for example a camera application may record the GPS location where a photograph was taken in the metadata associated with the image file; however, this location is not where the data is stored. Additionally the image capture location cannot be used by another application which knows nothing about the protocol used by the camera application.

Although the present examples are described and illustrated herein as being implemented in a system as shown in FIG. 7, the system described is provided as an example and not a limitation. As those skilled in the art will appreciate, the present examples are suitable for application in a variety of different types of computing systems and the data store may comprise a distributed or cloud based data store. A number of APIs are given above as examples of how they may be augmented with location information (e.g. user location information). It will be appreciated that other APIs may be similarly augmented. Through use of a location attribute as described above, geographic location becomes an intrinsic component of a data store and a system including such a data store.

The systems and methods described herein are not intended to replace any requirements for digital rights management (DRM) methods to prevent someone copying a file and the systems and methods may be used in combination with DRM to avoid someone copying a file from a location secured place to an unsecured place and taking it away in clear text.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The term 'user' is used above to refer to the user or client device which a user is using to interact with the data store, application software etc. Some of the systems and methods described above use user location as an additional parameter. It will be appreciated that the user location data may comprise sensitive user data and therefore consent may be obtained from the user before this information is shared.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A data storage system comprising:
a data store arranged to store a plurality of data elements, each data element having an associated location attribute identifying a geographical location of the data element and wherein the location attribute is stored in a location which is co-located with the data element; and
a hardware processor configured to:
determine whether an access policy associated with a data element of the plurality of data elements is satisfied based on both a location of a user making a request regarding the data element and a location of the data element;
determine whether the access policy associated with the data element is satisfied based on a relative location of the user and the data element;
determine whether the access policy associated with the data element is satisfied based on a location of at least one other user;
determine whether the access policy associated with the data element is satisfied based on at least one of a location of the user and a location of a primary replica of the data element and, if the access policy is not satisfied, identifying a second replica of the data element, the second replica having a location which would satisfy the access policy and migrating the primary replica to the second replica, and, if the access policy is satisfied, provide contact information comprising location information for the primary replica of the data element in response to the request; or select a replica from a set of replicas of the data element based on a location attribute associated with each replica of the data element and provide contact information comprising location information for the selected replica of the data element in response to the request.

2. A data storage system according to claim 1, arranged such that each location attribute can only be written by a single trusted entity.

3. A data storage system according to claim 2, further comprising an operating system and wherein the operating system is arranged to write the location attribute associated with a data element and to update the location attribute when the data element is moved to a new geographical location.

4. A data storage system according to claim 1, wherein a single location attribute is associated with a group of co-located data elements.

5. A data storage system according to claim 1, further comprising a metadata service arranged to track locations of data elements and to respond to location requests received from clients.

6. A data storage system according to claim 5, wherein the metadata service is further arranged to store access control policies associated with data elements.

7. A data storage system according to claim 5, wherein the metadata service is further arranged to store data placement policies associated with data elements and to control storage of a data element in accordance with any associated data placement policy.

8. A data storage system according to claim 7, wherein the system comprises a cloud computing system and wherein the system is arranged to only store a data element in a location specified within the data element's associated data placement policy.

9. A data storage system according to claim 1, wherein the system comprises a New Technology File System and wherein the location attribute for a data element is stored as a file location Attribute Type.

10. A data storage system according to claim 1, wherein the system comprises an SOL server, each data element comprises a database record and the location attribute for each database record is stored in a location column.

11. A method comprising:
tracking location of data elements using a location attribute associated with each data element, the location attribute identifying a geographical location of the data element and being stored with the data element;
receiving a user request to locate a data element;
making a decision, by one or more hardware processors, based on at least one of a location of the user and a location of the data element; and
based on result of the decision, providing location information for the data element in response to the user request,
wherein:
determining if an access policy associated with the data element is satisfied based on at least one of a location of the user and a location of the data element comprises:
determining if an access policy associated with the data element is satisfied based on both a location of the user and a location of the data element;
determining if an access policy associated with the data element is satisfied based on both a location of the user and a location of the data element comprises:

determining if an access policy associated with the data element is satisfied based on a relative location of the user and the data element;
determining if an access policy associated with the data element is satisfied is further based on a location of at least one other user;
making a decision based on at least one of a location of the user and a location of the data element comprises:
determining if an access policy associated with the data element is satisfied based on at least one of a location of the user and a location of a primary replica of the data element, and
if the access policy is not satisfied, identifying a second replica of the data element, the second replica having a location which would satisfy the access policy and migrating the primary replica to the second replica,
and wherein providing location information for the data element in response to the user request based on result of the decision comprises:
if the access policy is satisfied, providing contact information comprising location information for the primary replica of the data element in response to the user request; or
making a decision based on at least one of a location of the user and a location of the data element comprises:
selecting a replica from a set of replicas of the data element based on a location attribute associated with each replica of the data element,
and wherein providing location information for the data element in response to the user request based on result of the decision comprises:
providing contact information comprising location information for the selected replica of the data element in response to the user request.

12. A method according to claim 11, wherein making a decision based on at least one of a location of the user and a location of the data element comprises:
determining if an access policy associated with the data element is satisfied based on at least one of a location of the user and a location of the data element; and
if the access policy is not satisfied, refusing access to the data element,
and wherein providing location information for the data element in response to the user request based on result of the decision comprises:
if the access policy is satisfied, providing contact information comprising location information for the data element in response to the user request.

13. A method according to claim 11, wherein determining if an access policy associated with the data element is satisfied based on at least one of a location of the user and a location of the data element comprises:
determining if an access policy associated with the data element is satisfied based on both a location of the user and a location of the data element.

14. A method according to claim 13, wherein determining if an access policy associated with the data element is satisfied based on both a location of the user and a location of the data element comprises:
determining if an access policy associated with the data element is satisfied based on a relative location of the user and the data element.

15. A method according to claim 11, wherein determining if an access policy associated with the data element is satisfied is further based on a location of at least one other user.

16. A method according to claim 11, wherein making a decision based on at least one of a location of the user and a location of the data element comprises:
    determining if an access policy associated with the data element is satisfied based on at least one of a location of the user and a location of a primary replica of the data element; and
    if the access policy is not satisfied, identifying a second replica of the data element, the second replica having a location which would satisfy the access policy and migrating the primary replica to the second replica;
    and wherein providing location information for the data element in response to the user request based on result of the decision comprises:
    if the access policy is satisfied, providing contact information comprising location information for the primary replica of the data element in response to the user request.

17. A method according to claim 11, wherein making a decision based on at least one of a location of the user and a location of the data element comprises:
    selecting a replica from a set of replicas of the data element based on a location attribute associated with each replica of the data element,
    and wherein providing location information for the data element in response to the user request based on result of the decision comprises:
    providing contact information comprising location information for the selected replica of the data element in response to the user request.

18. A data storage system comprising:
    a data store arranged to store a plurality of data elements, each data element comprising a location attribute identifying a geographical location of the data element;
    a metadata service arranged to provide access to location attribute data in response to requests received from other entities;
    a hardware processor;
    a memory arranged to store executable instructions, which when executed, cause the processor to write data representative of the geographical location of a data element to the location attribute within the data element and to prevent other software programs from writing to the location attribute within a data element,
    the processor being configured to:
        determine whether an access policy associated with a data element of the plurality of data elements is satisfied based on both a location of an entity of the other entities making a request regarding the data element and a location of the data element;
        determine whether the access policy associated with the data element is satisfied based on a relative location of the entity and the data element;
        determine whether the access policy associated with the data element is satisfied based on a location of at least one other entity;
        determine whether the access policy associated with the data element is satisfied based on at least one of a location of the entity and a location of a primary replica of the data element and, if the access policy is not satisfied, identifying a second replica of the data element, the second replica having a location which would satisfy the access policy and migrating the primary replica to the second replica, and, if the access policy is satisfied, provide contact information comprising location information for the primary replica of the data element in response to the request; or
        select a replica from a set of replicas of the data element based on a location attribute associated with each replica of the data element and provide contact information comprising location information for the selected replica of the data element in response to the request.

19. A data storage system according to claim 18, wherein the metadata service is further arranged to store an access control policy for a data element, the policy being defined in terms of geographical location of the data element and at least one of the data store and the metadata service being arranged to control access to data elements in accordance with the access control policy.

20. A data storage system according to claim 18, wherein the metadata service is further arranged to store a data placement policy for a data element, the policy being defined in terms of geographical location of the data element and at least one of the data store and the metadata service being arranged to control storage of data elements in accordance with the data placement policy.

* * * * *